United States Patent [19]

Rhodes

[11] 4,299,190
[45] Nov. 10, 1981

[54] LITTER BOX

[76] Inventor: Andrew Rhodes, 51 Watson Ave., Ossining, N.Y. 10562

[21] Appl. No.: 116,227

[22] Filed: Jan. 28, 1980

[51] Int. Cl.³ .............................................. A01K 29/00
[52] U.S. Cl. ......................................................... 119/1
[58] Field of Search .......................................... 119/1

[56] References Cited

U.S. PATENT DOCUMENTS

| 3,233,588 | 2/1966 | Thomas | 119/1 |
| 3,908,597 | 9/1975 | Taylor | 119/1 |
| 4,027,625 | 6/1977 | Wheeler | 119/1 |
| 4,096,827 | 6/1978 | Cotter | 119/1 |

Primary Examiner—Hugh R. Chamblee
Attorney, Agent, or Firm—Howard C. Miskin

[57] ABSTRACT

An animal litter box provided with a mechanism for replacing fouled litter includes a base member supporting a housing for rotation about a transverse axis, the housing including an open topped lower litter box section and an open bottom upper storage box section in end to end engagement with the lower section and releasably locked in such engagement by hasp mechanisms. A plastic garbage bag is housed in the storage section with its opening border clamped between the confronting faces of the upper and lower sections and a pair of opposing flaps supported by opposite faces of the storage box are swingable between a closed position clamping the bag below its peripheral border and an open bag open position, the flaps being releasably magnetically retained in closed position by complementary latch members on the flap member and a hinged door registering with an access opening in a wall of the storage box. The litter box section is also provided with an access opening and a hinged closure door therefor.

10 Claims, 9 Drawing Figures

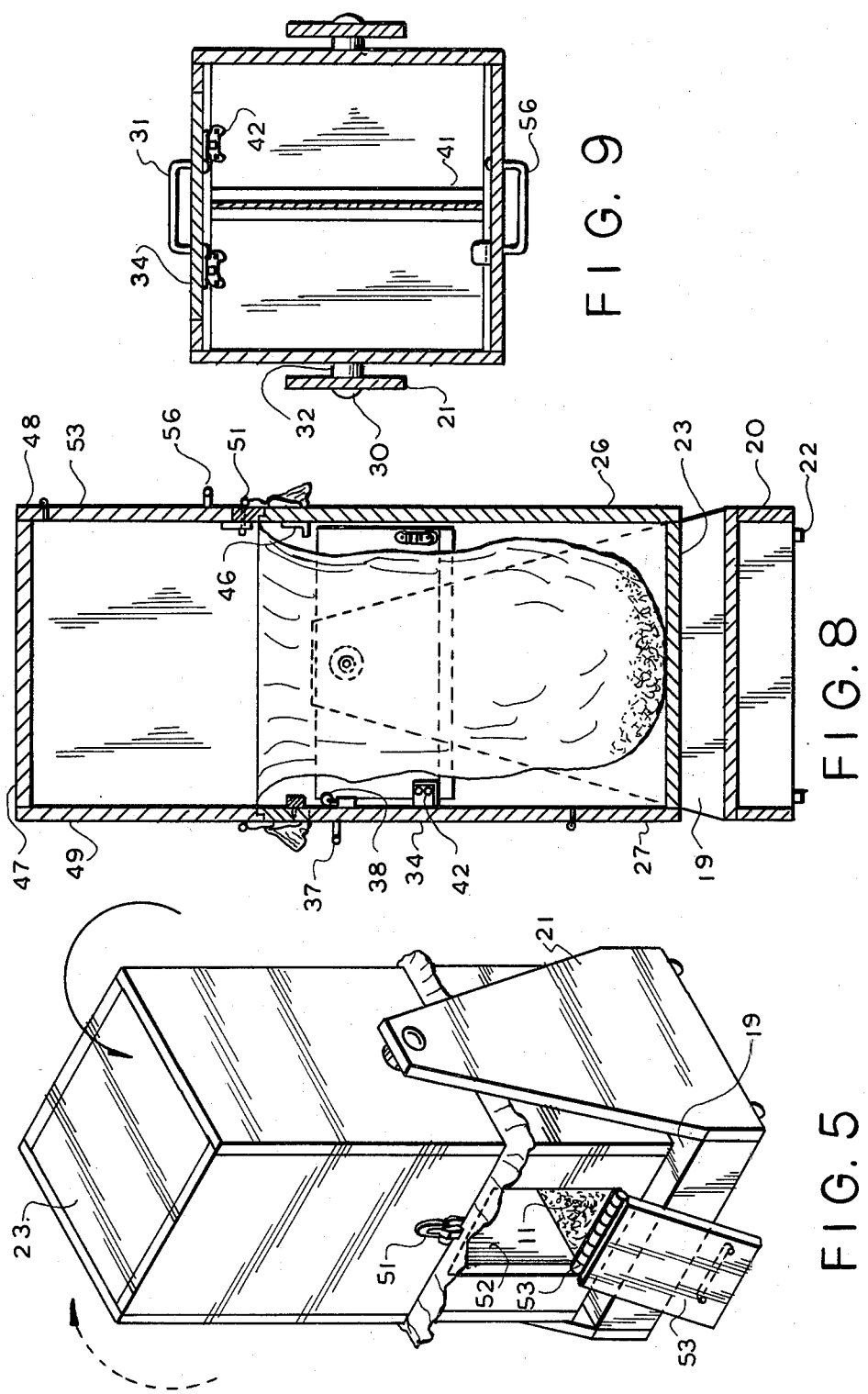

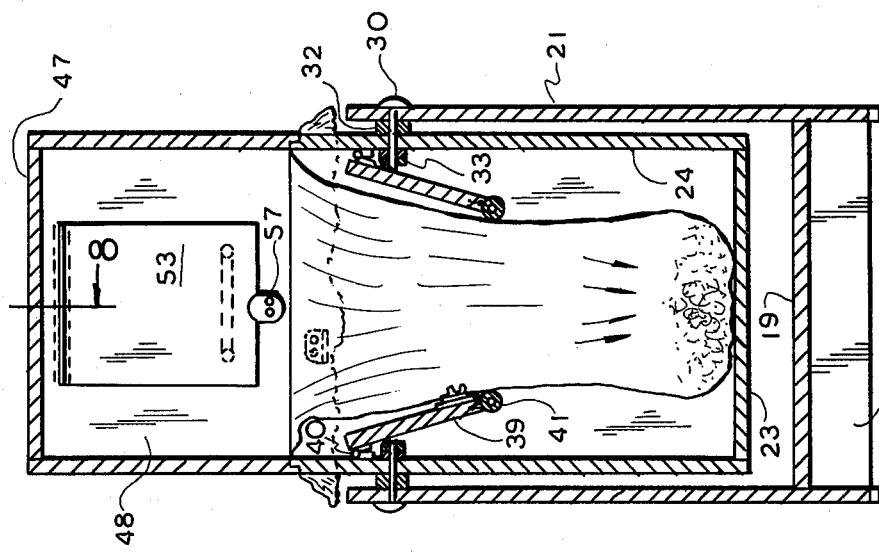
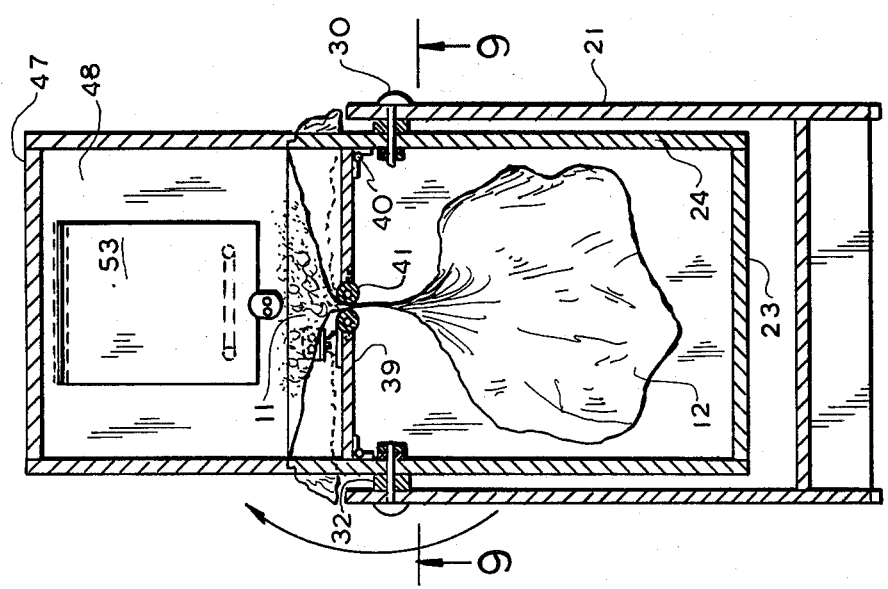

LITTER BOX

BACKGROUND OF THE INVENTION

The present invention relates generally to improvements in animal sanitary devices and it relates more particularly to an improved pet animal litter box provided with a mechanism for removing and storing the spent litter and replacing it with fresh litter.

In the keeping of pet animals as cats and dogs or the like, it is necessary to attend to their sanitary needs and particularly in the case of a pet animal kept in the home such attention involves tasks which at their best, are unattractive and highly undesirable. A practice generally presented to reduce the problems associated with the attention to the animals sanitary needs is the use of a litter material which in a particulate state and lines the bottom of a litter box or tray and the animal is trained to attend to its needs in the litter box. However it is necessary to frequently periodically replace the spent or fouled litter with fresh litter, a procedure with the conventional litter box which is highly awkward and inconvenient and otherwise leaves much to be desired.

SUMMARY OF THE INVENTION

It is a principal object of the present invention to provide an improved animal sanitary device.

Another object of the present invention is to provide an improved animal litter box.

Still another object of the present invention is to provide an improved animal litter box having a mechanism for discharging the spent or fouled litter from the litter box into a storage receptacle and replacing the discharged litter with fresh litter A further object of the present invention is to provide an improved device of the above nature characterized by its simplicity, ruggedness, reliability, ease and convenience of use and great versatility and adaptability.

The above and other objects of the present invention will become apparent from a reading of the following description taken in conjunction with the accompanying drawing which illustrate a preferred embodiment thereof.

The present invention contemplates the provision of an animal litter box device comprising a housing rotable about a transverse axis and including a litter box defining bottom section and a bag receiving upper section in end to end communication with the bottom section, a litter receiving bag separably disposed in said housing with its mouth retained in an open downwardly facing position and means for releasably contracting said bag below its mouth while disposed in said housing to close said bag.

In accordance with the preferred embodiment of the present invention, the housing upper and lower sections are of similar square transverse cross section closed at their upper and lower ends respectively and open at their confronting ends and releasably couplings are provided at the adjacent borders of the upper and lower sections to separably connect the sections in end to end relationship. The upper section is pivotally connected proximate its upper border between a pair of opposite upright bracket plates projecting from a base member. The bag which may be a conventional polyethylene garbage bag, has its opening border folded over the peripheral edge of the top section and is locked in such position by the bottom section which is end to end coupled to the top section. The top section has a rectangular access opening which is closed by a door hinged to the opening upper edge and the bottom section is likewise provided with rectangular access opening to the bottom edge of which is hinged a door which functions in its open condition as an animal ramp. The bag contracting means comprises a pair opposing panels hinged along their outer edges to opposite inside faces of the top section proximate its bottom edge and provided along their inner edges with resilient clamping gaskets. A magnet latch pair is provided on at least one of the panels and the adjacent upper section side wall to releasably retain the panels in closed position and the upper section door and the panels are provided with registering latches which are in coupled engagement when the door and panels are in closed positioned to lock the panels in closed positions to keep the bag sealed.

The improved litter box device is simple, rugged and reliable and greatly facilitates the sanitary disposal and storage of spent and fouled litter without any direct handling thereof.

BRIEF DESCRIPTION OF THE DRAWINGS

FIG. 5 is a perspective view of the device in its upright normally operated position;

FIG. 6 is a transverse vertical medial sectional view of the assembled device showing the spent litter storage bag in closed condition;

FIG. 7 is a view similar to FIG. 6 but with the bag shown in open condition;

FIG. 8 is a sectional view taken along line 8—8 in FIG. 7; and

FIG. 9 is a sectional view taken along line 9—9 in FIG. 6.

DESCRIPTION OF THE PREFERRED EMBODIMENT

Figure 1:
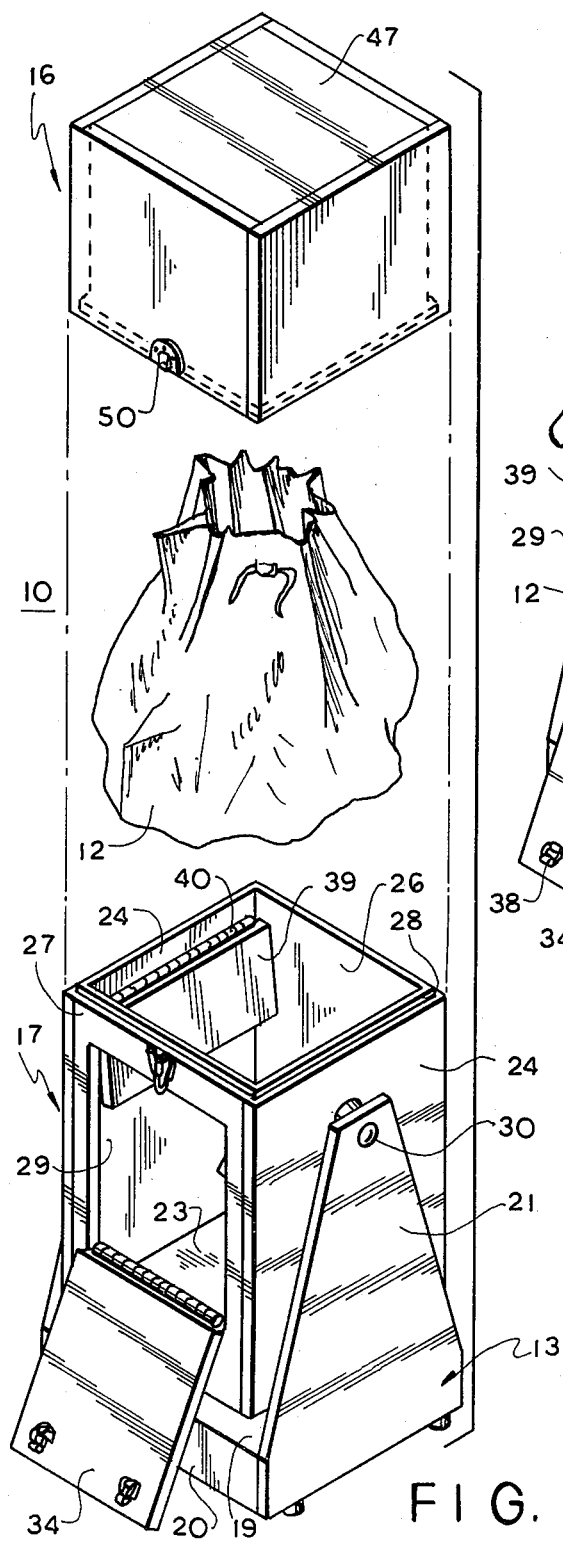
FIG. 1 is a perspective view of the improved litter box device illustrated in an inverted condition with the litter bag and litter box section separated.
Figure 2:
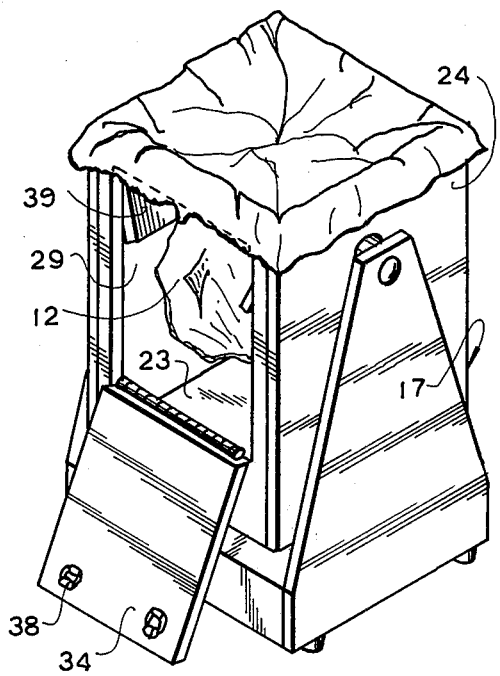
FIG. 2 is an inverted perspective view thereof with the bag inserted and the access door to the storage bottom section open.

Referring now to the drawings which illustrate a preferred embodiment of the present invention, the reference numeral 10 generally designates the improved litter handling and box device which is shown as applied to a household pet such as a cat. The litter device 10 is employed with any suitable particulate litter material 11 and a conventional garbage disposal bag 12 formed of a thin plastic film such a polyethylene or the like and comprises a base of support member 13 and a housing 14 which includes a litter box defining lower section 16 and a disposal box defining upper section 17. In the normal use of the litter device 10 the lower and upper housing sections 16 and 17 are separably connected end to end and in mutual communication and is vertically supported by support member 13 with the lower section 16 lower most. The device 10 is for the most part constructed of wood, particle board, plastic or other suitable material, the interior faces of housing 14 being coated or lined with a non-absorbent layer resistant to the spent and fouled litter and the exterior of the device being desirably decorated.

The support member 13 includes a square base plate 19 having rectangular skirt walls 20 depending from its front and rear walls. A pair of laterally spaced parallel vertical trapezoidal bracket plates 21 project upwardly from the side edges of base plate 19 and terminate at their bottoms in depending side skirt walls and are provided proximate their apices with laterally aligned coaxial boxes. Rubber foot pieces 22 depend from the front and rear ends of plates 21.

The housing upper section 17 is of square transverse cross-section of slightly less dimensions than base plate 19 and is relatively long and open at its bottom and closed at its top by a square end wall 23. Depending from the periphery of end wall 23 are a pair of rectangular side walls 24 and rectangular front and rear walls 26 and 27. A stepped peripheral groove 28 is formed in the outer faces of the walls 24, 26 and 27 and a rectangular access opening 29 is formed in rear wall 27 with is upper and lower edges spaced below and above the upper and lower edges of rear wall 27.

The housing upper section is desposed, in the housing inverted condition as shown in FIGS. 1 to 4, 6 and 7, with bottom wall 23 spaced above base plate 19 and side walls spaced inwardly of bracket plates 21. Pivot bolts 30 project through respective bores in bracket plates 21 and engage axially aligned bores in proximate side walls 24 skirt distances below their top edges. Axially bored cylindrical spaces engage bolts 30 between the confronting faces of adjacent side walls 24 and bracket plates 21 and the inner ends of bolts 30 are thread engaged by nuts 33 overlying respective washer to secure upper section 17 between bracket plates 21 and permit the rotation of the housing to upper section 17 about the axis of bolts 30.

A rectangular door 34 substantially mating access opening 29 is swingably connected along its upper outer edge to the upper outer edge of opening 29 by a piano hinge 36. A horizontal wire handle 37 is medially affixed to the outer face of door 34 proximate its bottom edge. Mounted on the lower border of the inside face of door 34 is a pair of laterally spaced male roll type separable coupling or catch member 38.

A bag closure defining pair of rectangular panels or rigid flaps 39 is connected to the lower borders of the inside faces of side walls 24 above the level of the lower edge of opening 29. Each of the panels 39 is of somewhat less than half the width of front or rear walls 26 and 27 and is connected along its upper outer edge to the inside face of respective side wall 24 by a piano hinge 40. A tubular resilient sealing gasket 41 of rubber or the like is suitably received to the free outside end face of each panel 39 and when the panels 39 are in their closed horizontal coplanar position the gaskets 41 are in a mutual compressed condition along their lengths.

Mounted on the top face of each of the panels 39 along the end edge thereof proximate the upper border of opening 29 is a female expandable jaw type female separable coupling member 42 which complements coupling member 38. When panels 39 are in their lowered coplanar closed condition and door 34 is in its closed position engaging opening 29 coupling member 38 separably engage coupling member 42 to releasably lock panels 39 in their closed coplanar position, moreover at least one of the panels 39 has mounted at a corner of its underface a magnetic catch member which engages a horizontal plate 46 of magnetic material when the respective panel is in its closed condition, the plate 46 being mounted on the lower inside face of rear wall 46. When the panels 39 are in their closed position with catch members 44 and 46 magnetically coupled and the housing 14 is in inverted condition as shown in FIG. 5, the panels are lightly retained in their closed position by the magnetic coupling and when unlocked by the opening of door 34 may be swung to a depending open position by a small downward force on the panels in addition to their own weight.

The litter box lower section 16 is of the same transverse cross-section as upper section 17 and relatively shorter and includes a square bottom wall 47, rectangular front and rear walls 48 and 49 and side walls 50. Formed in the upper edges of walls 48, 49 and 50 surrounding the top open end of lower section 16 is a peripheral stepped groove which compliments and mates stepped peripheral groove 28. In the assembled operative condition of housing 14 the lower and upper sections 16 and 17 are in seperable communicating end to end positions with the stepped grooves in mating engagement. The sections 16 and 17, are releasably locked in their assembled condition by conventional toggle type hasps affixed to the adjacent borders of the outer faces of section front and rear walls 26, 27, 48 and 49, each hasp including a catch member 50 located at the upper border of lower section 6 and a complimentary lever operated loop member 51 located on the upper section lower border.

A rectangular, animal access opening 52 is formed in lower section front wall 48 with its lower edge being disposed above base wall 47. A rectangular door 53 is of about the shape and dimensions of opening 52 and is swingably connected along its bottom outer edge to the bottom outer edge of opening 52 by a piano hinge 54. A wire handle 56 is mounted to the upper border of the outside face of door 53 and a stop member 57 is secured to the upper border of the inside face of front wall 48 and lies in the path of the upper border of door 53 to limit its inward movement. When the device 10 is in its upright operative position lower section bottom wall 47 is located above base wall 19 and door 53 is opened outwardly with its bottom edge resting on the floor to define a ramp into the litter box through opening 52.

Figure 4:
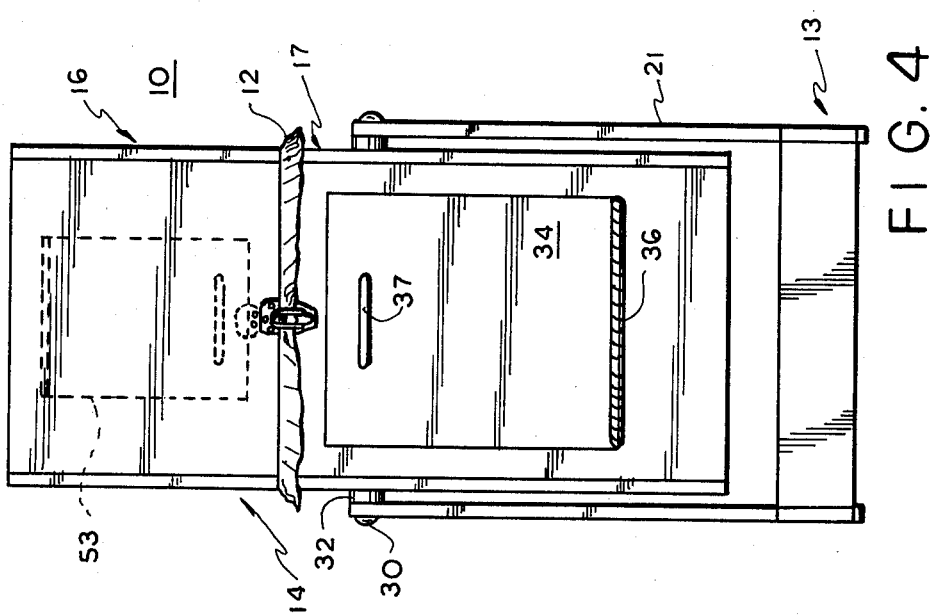
FIG. 4 is a front elevational view of the closed assembled device in inverted position.
Figure 3:
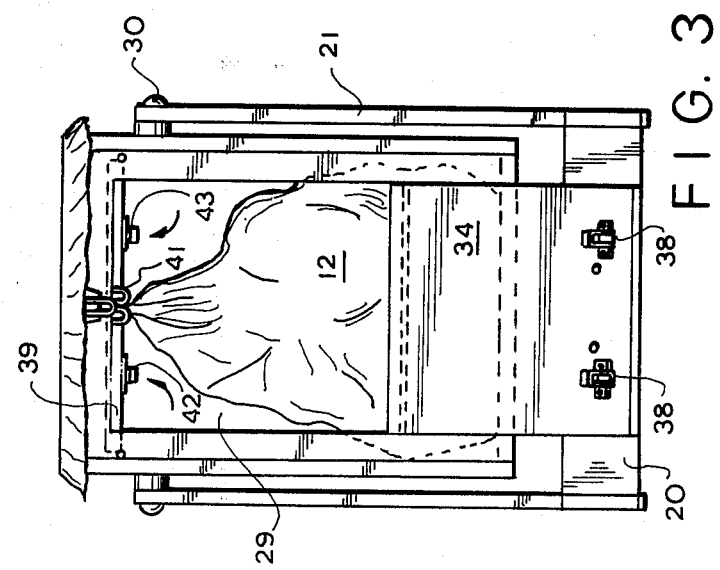
FIG. 3 is a front elevational view of the arrangement shown in FIG. 2.

Considering now the application and operation of the improved litter handling device 10 described above with the device 10 in its normal operative position as shown in FIG. 5 and empty, the doors 34 and 53 are closed and the housing 14 rotated 180° to its inverted condition as shown in FIG. 4. The hasps 50, 51 are unlatched and the litter box section 16 removed exposing the end opening to top section 17. The closure flaps 39 which are lightly magnetically retained in closed position are opened by pressing lightly downwardly thereon to free them from the force of magnetic catch 44, 46. A heavy duty polethylene garbage bag 12 is inserted into inverted upper section 17 and the upper border of the bag 12 is folded over the upper section edge 28 onto the adjacent border of walls 24, 26 and 27 to effect a snug seal therewith. The closure flaps 39 are then raised through opening 29 to pinch and close the upper portion of the bag between gaskets 41, the flaps 39 being retained in their raised positions by magnetic catch 44, 46. The service door 34 is then closed to lock flaps 34 in their closed positions consequent to coupling engagement between catch members 38 and 42.

A predetermined desired amount of fresh particulate litter is poured into the bag above the pinched area thereof and the litter box section 16 is then positioned end to end in section 17 to clamp the bag border between the confronting registering stepped peripheral edges and the hasp couplings 50, 51 then locked. The assembled bag 12 and housing 14 are then rotated 180° to upright position and rocked to evenly distribute the litter 11 over the litter box base 47. The door 53 is then opened to expose the litter through opening 52 and the litter box is ready for use.

The dispose of and replace the fouled litter door 53 is closed, housing 14 inverted by swinging 180° and is tapped to release sticking particles. The door 34 is then opened to unlock flaps 39 and the weight of the litter bearing on the flaps is sufficient to open the flaps against the influence of magnetic catch 44, 46 and the litter falls into bag 12. The flaps 39 are then raised to their closed position to be lightly retained there by the magnetic clutch and door 34 closed to lock the flaps in their closed position. Housing 14 is then rotated 90° to a horizontal position with door 43 facing upwardly. Door 53 is opened, litter poured into litter box 16 through opening 52, the door 53 closed, the housing 14 returned to its normal operative position and the door 53 then opened to bring the handle 56 to rest on the floor and the litter box is then ready for further use. The aforesaid litter replacing procedure may be repeated when desired.

To remove the bag 12 when filled with litter; the litter in the litter box is discharged into bag 12 as explained above and with door 53 closed and door 34 closed and locking flaps 39 in their bag pinching closed position and housing 14 inverted, hasps 50, 51 are unlocked and litter box section 16 is removed. The border of bag 12 is separated from the walls of section 17 and twisted above flaps 39 to effect a tight seal and a wire tie is then applied to the twisted portion of the bag to lock the seal. The flaps 39 are then tapped to swing them to their depending open position and the sealed bag removed and discarded. The interior of housing may then be cleaned and a new bag 12 inserted in the above manner.

While there has been described and illustrated a preferred embodiment of the present invention it is apparent that numerous alterations omissions and additions may be made without departing from the spirit thereof.

What is claimed is:

1. A litter handling device comprising a housing including a lower open topped litter box having a bottom wall and a side wall with an animal access opening and an upper open bottomed storage box separable end to end coupled to the top of said litter box and in communication with the interior thereof, a base member disposed below and rotatably supporting said housing for rotation about a transverse axis, a disposable bag disposed in said storage box and having a downwardly directed open end and a peripheral border, said housing having rataainer means releasably engaging and retaining said peripheral border spread in an open condition and closure means located in and mounted to said storage box for releasably contracting said bag below it spread peripheral border to a closed condition.

2. The litter handling device of claim 1 wherein said base member includes laterally spaced opposite uprights, said housing means being disposed between and rotatably supported by said uprights.

3. The litter handling device of claim 1 wherein said retainer means is defined by the confronting end faces of said end to end coupled litter and storage boxes, between which end faces said bag peripheral border is releasably clamped.

4. The litter handling device of claim 1 including a plurality of peripherally spaced pairs of mutually separably engaged coupling members mounted on adjacent borders of said end to end coupled litter and storage boxes.

5. The litter handling device of claim 1 including a door hinged to an edge of said access opening and swingable between a closed position engaging said access opening and an outwardly extending open position.

6. The litter handling device of claim 1 wherein said closure means comprises a pair of opposite flap members supported on opposing inside faces of said storage box for swinging between a closed position extending toward each other and clamping said bag between the confronting edges thereof and a spread open position.

7. The litter handling device of claim 6 including means for releasing retaining said flap members in said closed position.

8. The litter handling device of claim 7 wherein said retaining means includes magnetic catch members affixed to one of said closure flaps and a wall of said storage box and being in magnetically retained engagement in the flap closed position.

9. The litter handling device of claim 6 including means for locking said closure flaps in their closed position.

10. The litter handling device of claim 9 wherein said storage box has a second opening formed in a peripheral wall thereof and comprising a door swingable about a transverse edge of said second opening between a closed position engaging said opening and an open position, said locking means including a pair of first latch members mounted on said flap members and a pair of laterally spaced second latch members mounted on said door and complimenting said first latch members and engaging said first latch members when said door and flap members are in their closed positions to releasably lock said flap members in closed positions.

* * * * *